Patented May 23, 1933

1,911,028

UNITED STATES PATENT OFFICE

CARL A. MAXWELL, OF CUYAHOGA FALLS, OHIO; WILLIAM C. ABELL, OF PARSONS, KANSAS; AND LUKE E. SAWYER, OF BEAVER FALLS, PENNSYLVANIA, ASSIGNORS TO FULLER LEHIGH COMPANY, OF FULLERTON, PENNSYLVANIA, A CORPORATION OF DELAWARE

TUBE BENDING DEVICE

Application filed November 18, 1930. Serial No. 496,380.

This invention relates to a device by means of which tubes, such as boiler tubes, for example, can be bent as desired while the tubes are cold without flattening the tubes.

Figure 1:
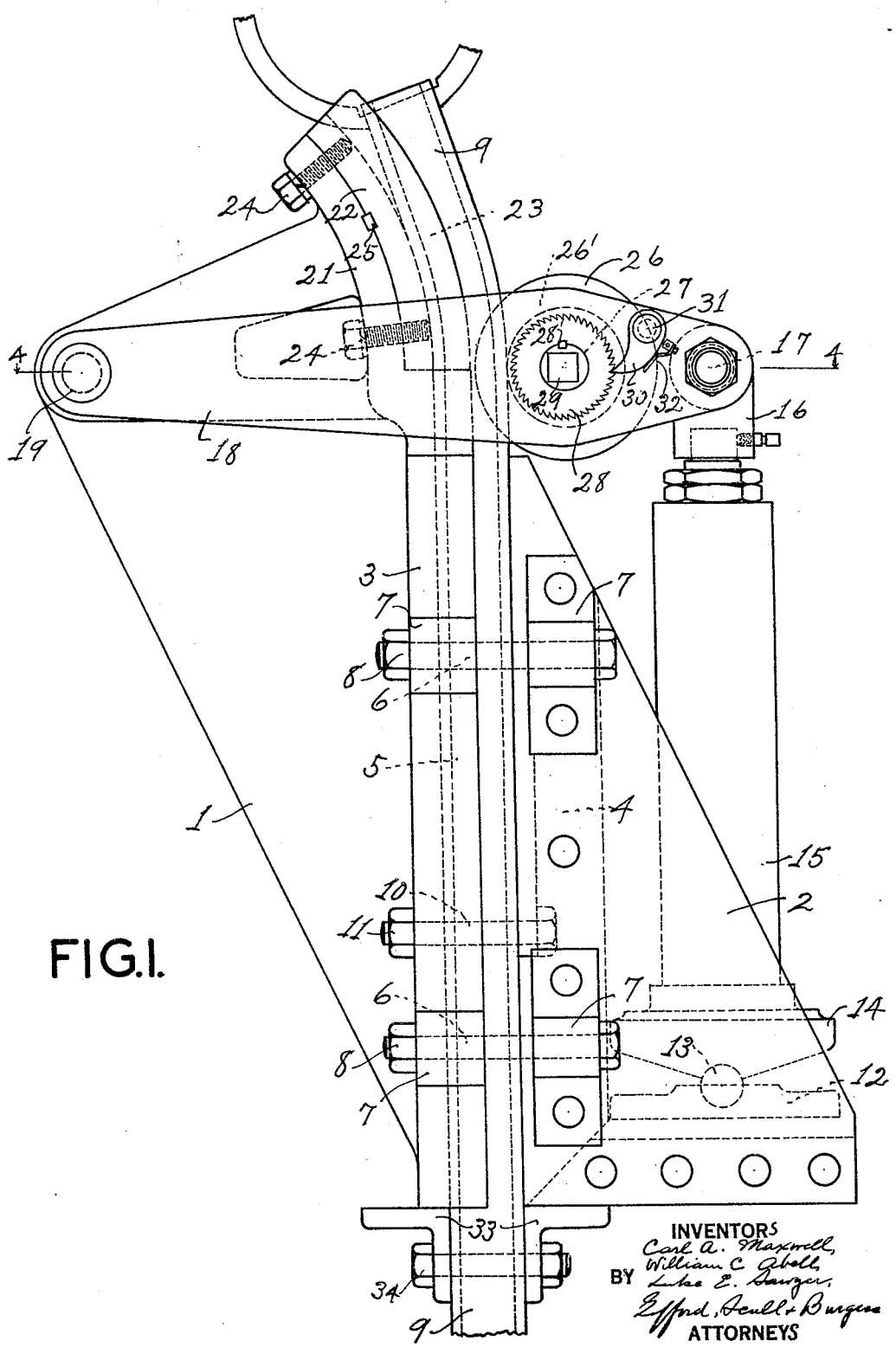
Figure 2:
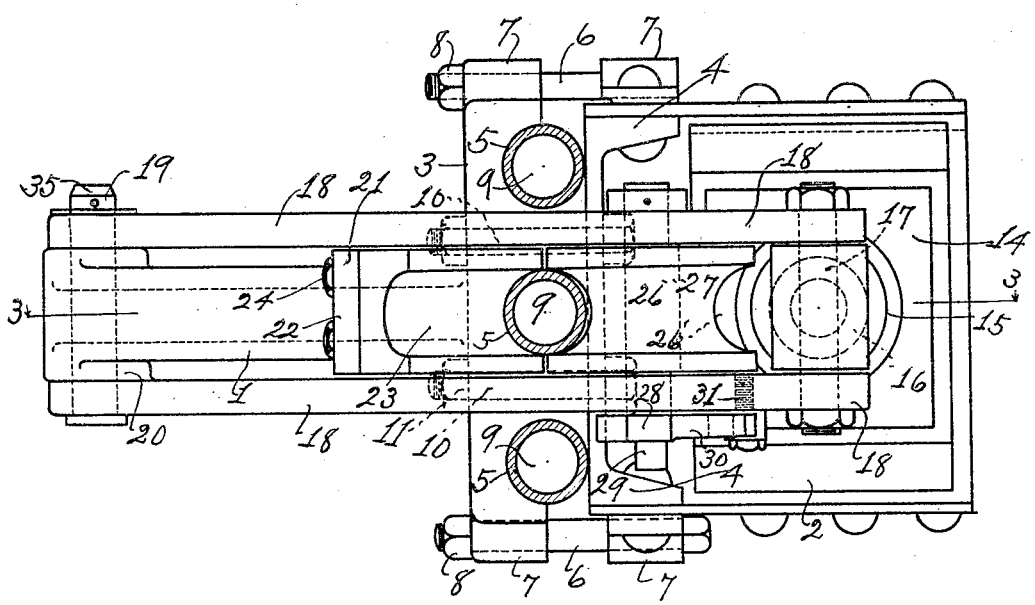
Figure 3:
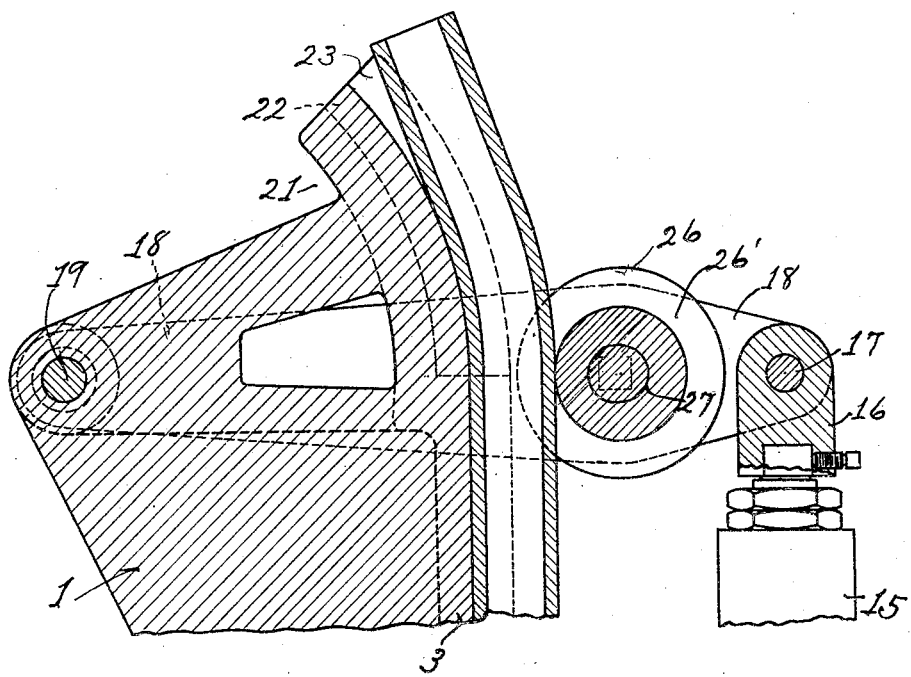
Figure 4:
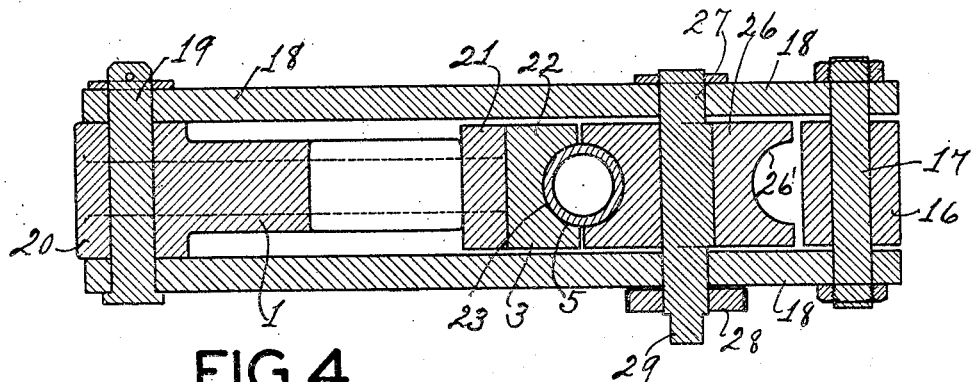

The invention will be understood from the description in connection with the accompanying drawings, in which Fig. 1 is a side view of the device; Fig. 2 is a plan view of the same; Fig. 3 is a section along the line 3—3 of Fig. 2 and Fig. 4 is a section along the line 4—4 of Fig. 1.

In the drawings reference characters 1 and 2 indicate two members of a supporting frame that may be held upon a row of tubes. The member 1 is provided with a contact plate 3 and the member 2 with a contact plate 4. One or both of these contact plates may be provided with grooves 5 to fit the tubes. Bolts 6 passing through lugs 7 on the supporting members 1 and 2 or plates 3 and 4 are provided with nuts 8 by means of which the plates 3 and 4 can be securely clamped to a row of tubes 9. In the illustrative embodiment of the invention, the device is shown clamped to three tubes of a row of tubes. Other bolts 10 provided with nuts 11 pass through the plates 3 and 4 between tubes 9 to aid in clamping the plates to the tubes.

The bottom plate 12 of the frame member 2 is recessed to accommodate a shaft 13 upon which a base or support 14 for a jack 15 is swiveled. The upper end of the jack 15 is connected by means of the head block 16 to a cross shaft 17 that is mounted in the ends of levers 18 between the same. The other ends of the levers 18 are provided with a shaft 19 which passes through a journal 20 near the edge of the supporting member 1.

The upper portion of the plate 3 is curved outwardly and is provided with a recess for a correspondingly curved insert 22. The insert 22 is provided with a curved groove 23 into which the bent portion of a tube is to be pressed and the insert 22 is attached to the curved portion 21 of the plate 3 by means of screw bolts 24 and a cross key 25.

A bending wheel 26 provided with a groove 26′ around its periphery to fit the tubes is rotatably mounted on an eccentric shaft 27 that is journaled in bearings in the levers 18. The shaft 27 has an extension beyond one of the levers 18 at one end, upon which extension a ratchet wheel 28 is keyed by means of the key 28′. The shaft 27 extends beyond the ratchet and is made square, as indicated at 29, for convenience in applying a wrench to turn the shaft. A pawl 30 is pivoted at 31 on one of the levers 18 and a spring 32 presses the pawl against the ratchet 28.

Cross supports 33 may be bolted against opposite sides of the tubes 9 by means of the bolts 34 to serve as a support for the device and to guide it as it is moved from one tube to the next to bend the tubes in succession.

The operation is as follows: The cross supports 33 are clamped to the row of tubes that are to be bent. The plates 3 and 4 are clamped to three tubes, of which the middle one is about to be bent as indicated in Figs. 1 and 2, the eccentric shaft 27 is turned by means of a wrench on the square end 29 to a position where the wheel 26 engages the tube 9 firmly with the groove 26′ of the wheel and the groove 23 in the member 22 practically surrounding the tube. The pawl 30 maintains the wheel 26 in its adjusted position. The jack 15 is operated, thus turning the levers 18 anti-clockwise as seen in Fig. 1, the jack swiveling slightly on the shaft 30. The tube 9 is thereby bent toward the left into the groove 23. After this tube has been bent, the device is moved along the supports 32 to the next tube and the same operation is repeated until all of the tubes of the row which it is desired to bend have been bent. The shaft 19 may be provided with a cotter-pin 35 to facilitate removal of the shafts 18 from one tube to another after the nuts on the bolts 6 and 10 have been removed.

Although a particular form of jack has been described in the specification, it is to be understood that it is not necessary to use this particular form of jack or lifting device in the invention, and changes and modifications can be made without departing from the spirit or scope of the invention.

We claim:

1. A tube supported tube-bending device comprising, a tube-embracing clamping mounting restricting one portion of the tube against bending, a reforming portion carried thereby, arms pivotally mounted behind said reforming portion and carrying a tube reforming roller therebetween in front of said portion, an eccentric journal mounting for said roller to move the latter to and from said portion, a ratchet wheel movable with said eccentric journal to lock the same, a pivoted ratchet engaging pawl swinging into locking engagement with the said wheel in any adjusted position of the eccentric journal, and a power amplifier supported on said mounting and connected to swing said arms on their pivot to thereby cause said reforming roller to move in tube-bending engagement relative to said reforming portion to bend a tube in conformity therewith.

2. A tube supported tube-bending device comprising, a tube-embracing clamping mounting restricting one portion of the tube against bending, a reforming portion carried thereby, arms pivotally mounted behind said reforming portion and carrying a tube reforming roller therebetween in front of said portion, an eccentric journal mounting for said roller to move the latter to and from said portion, a ratchet wheel movable with said eccentric journal to lock the same, a pivoted ratchet engaging pawl swinging into locking engagement with the said wheel in any adjusted position of the eccentric journal, a power amplifier supported on said mounting and connected to swing said arms on their pivot to thereby cause said reforming roller to move in tube-bending engagement relative to said reforming portion to bend a tube in conformity therewith, and means in connection with said clamping mounting to spread the bending strain over a series of adjacent tubes.

3. A tube supported tube-bending device comprising, a tube-embracing clamping mounting restricting one portion of the tube against bending, a removable reforming portion carried thereby, arms pivotally mounted behind said removable reforming portion and carrying a tube reforming roller therebetween in front of said portion, an eccentric journal mounting for said roller to move the latter to and from said portion, a ratchet wheel movable with said eccentric journal to lock the same, a pivoted ratchet engaging pawl swinging into locking engagement with the said wheel in any adjusted position of the eccentric journal, and a power amplifier supported on said mounting and connected to swing said arms on their pivot to thereby cause said reforming roller to move in tube-bending engagement relative to said reforming portion to bend a tube in conformity therewith.

CARL A. MAXWELL.
WILLIAM C. ABELL.
LUKE E. SAWYER.